Patented Oct. 4, 1932

1,880,513

UNITED STATES PATENT OFFICE

CYRIL J. STAUD AND CHARLES S. WEBBER, OF ROCHESTER, NEW YORK, ASSIGNORS TO EASTMAN KODAK COMPANY, OF ROCHESTER, NEW YORK, A CORPORATION OF NEW YORK

CELLULOSE ACETATE SOLVENT AND COMPOSITION

No Drawing. Application filed March 5, 1929. Serial No. 344,578.

This invention relates to solvents for making strong flowable solutions of cellulose acetate and likewise relates to the cellulose acetate compositions produced by the aid of such solvents.

The cellulose acetate in common commercial use today is of the acetone-soluble type. Formerly a cellulose acetate of the chloroform-soluble type was used, but, due to the greater expense of chloroform and the brittle film obtained from the evaporation of a solution of the ester in this solvent, this type of cellulose acetate has little, if any, commercial value in this form.

The chloroform-soluble cellulose acetate is converted to the acetone-soluble cellulose acetate by various known methods of hydrolysis. By this means of conversion, the chloroform-soluble cellulose acetate of little value is converted to a cellulose acetate having solubilities which fit it for the manufacture of lacquers, films and photographic purposes. The acetone-soluble cellulose acetate of commerce contains approximately 38% of acetyl. There are many other acetyl esters of cellulose which are obtained by longer hydrolysis of the cellulose acetate. These esters may contain from 44.8% of acetyl to as low as 0% acetyl, the latter being called a regenerated cellulose. It is probable, therefore, that there are in this range, esters of no doubt considerable commercial value which, as yet, have not been extensively used.

In order to utilize a cellulose ester for commercial purposes, it was found, as above noted, that a suitable solvent must be found which is both available and inexpensive. Such a solvent must not alter the transparency of the films or in any way decrease the flexibility or ductility of the products that may be formed therefrom. In order then to utilize some of the cellulose acetates which have heretofore had little commercial use, we have endeavored to obtain a solvent which will satisfy the requirements.

It is the object of the present invention to provide a solvent for the acetyl esters of cellulose which have the hereinabove described properties.

We have found that a combined solvent consisting of a mixture of an alkyl ester of an alpha hydroxy acid, such, for example, as tartaric, glycolic, lactic, racemic, malic, glyceric and mandelic acids with ethylene chloride is an excellent compound solvent of cellulose acetate having from approximately 31% to 45% acetyl content. This is indeed surprising, as neither class of these materials per se acts as a solvent for the cellulose ester. The lower alkyl esters of these acids, as would be expected, have a more marked solubilty of the cellulose acetates than do the alkyl esters derived from the higher members of the aromatic series. The same is true of the substituted alpha hydroxy acids in that the higher the number of carbon atoms contained therein, the lower is their power to dissolve the cellulose acetate.

Our compound solvent not only acts as an excellent solvent of the cellulose acetate, but also due to the high boiling point of this class of esters of the alpha hydroxy acids, the vapor pressure of the compositions is markedly reduced. The reduction in vapor pressure, of course, has many advantages. For instance, due to the reduction in volatility of the solvents, a film having more uniform thickness is produced when a dope containing these constituents is flowed upon a suitable film-forming surface. In the manufacture of lacquers and especially brush lacquer, the decrease in volatility is likewise of great importance.

As hereinabove stated, we are able, by these compound solvents, to dissolve cellulose acetates which have heretofore only been soluble in solvents from which they cannot be separated without entailing unnecessary expense and resulting in products in which have been found no commercial uses. By revealing, therefore, this inexpensive solvent for these cellulose esters, many commercial uses for them will, not doubt, result.

We will now describe several examples of our invention, but it will be understood that we shall not be restricted thereby except as indicated in the appended claims.

Mixtures of ethyl tartrate and ethylene chloride are solvents for acetone soluble cellulose acetate containing from 31% to 42% acetyl. 5 parts of cellulose acetate containing 34% acetyl may be dissolved in 30 parts of a solvent consisting of from 50% to 95% of ethylene chloride by volume and from 50% to 5% of ethyl tartrate by volume. Above 95% ethylene chloride by volume, the mixture becomes somewhat hazy and it is necessary to add 2% or more of methyl alcohol or a higher percentage of aliphatic alcohols, such as ethyl, propyl, butyl, &c.

Ethyl glycolate or other esters of glycolic acid of low molecular weight will dissolve when mixed with 40% to 95% by volume of ethylene chloride, cellulose acetates containing from 37% to 44.8% acetyl. At concentrations approximating 50% ethylene chloride by volume, chloroform soluble cellulose acetate, or, in other words, cellulose triacetate, becomes much less soluble and hydrated cellulose acetate of an acetyl content as low as 31% acetyl becomes soluble. At above 95% ethylene chloride by volume, acetone soluble cellulose acetates having 38% to 42% acetyl are less soluble. The addition of small quantities of methyl or other low boiling aliphatic alcohols to the solvent mixture renders it suitable for dissolving the cellulose acetates of higher acetyl content.

Mixtures of ethyl or methyl lactate and ethylene chloride in proportions of from 50% to 95% ethylene chloride and from 50% to 5% of the lactic acid ester are found suitable solvents for cellulose acetate having an acetyl content of from 38% to 42%.

Other substances which impart useful qualities of the product may be added to the hereinabove described flowable compositions, such for example, as triphenyl phosphate, tricresyl phosphate, camphor and monochlornaphthalene. Non-solvents may likewise be added to these solutions but not in sufficient amounts to precipitate the ester from the solution. Examples of such substances are benzol, xylol, ethyl alcohol, etc.

Various changes may be made in the proportions indicated in the above examples and known equivalents substituted for the substances herein given without in any way departing from the invention or sacrificing any of the advantages derived therefrom.

Having thus described our invention, what we claim as new and desire to secure by Letters Patent is:

1. A composition of matter having a relatively low vapor pressure comprising a cellulose acetate having an acetyl content from substantially 31% to 45%, dissolved in a mixture of ethyl lactate and ethylene chloride.

2. A flowable film-forming composition having a relatively low vapor pressure comprising cellulose acetate having an acetyl content from substantially 31% to 45% dissolved in a mixture containing 50% to 5% of ethyl lactate and 50% to 95% of ethylene chloride.

3. A composition of matter having a relatively low vapor pressure comprising a cellulose acetate having an acetyl content from substantially 31% to 45%, dissolved in a mixture of ethylene chloride and an alkyl ester of an alpha hydroxy acid selected from the group consisting of ethyl lactate, ethyl tartrate and ethyl glycolate.

4. A flowable film forming composition having a relatively low vapor pressure comprising cellulose acetate having an acetyl content from substantially 31% to 45% dissolved in a solvent mixture containing ethylene chloride and an alkyl ester of an alpha hydroxy acid selected from the group consisting of ethyl lactate, ethyl tartrate and ethyl glycolate.

5. A flowable film forming composition having a relatively low vapor pressure comprising cellulose acetate having an acetyl content from substantially 31% to 45% dissolved in a solvent mixture containing 50% to 95% of ethylene chloride and from 50% to 5% of an alkyl ester of an alpha hydroxy acid selected from a group consisting of ethyl lactate, ethyl tartrate and ethyl glycolate.

6. A composition of matter having a relatively low vapor pressure comprising a cellulose acetate having an acetyl content of from substantially 31% to 45%, dissolved in a mixture of ethyl tartrate and ethylene chloride.

7. A composition of matter having a relatively low vapor pressure comprising a cellulose acetate having an acetyl content of from substantially 31% to 45%, dissolved in a mixture of ethyl glycolate and ethylene chloride.

Signed at Rochester, New York, this 28th day of February, 1929.

CYRIL J. STAUD.
CHARLES S. WEBBER.